United States Patent
Fujiwara (10) Patent No.: US 9,541,628 B2
(45) Date of Patent: Jan. 10, 2017

(54) POSITION DETECTION SYSTEM

(71) Applicant: Mitsubishi Electric Corporation, Chiyoda-ku (JP)

(72) Inventor: Hideto Fujiwara, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 308 days.

(21) Appl. No.: 14/493,512

(22) Filed: Sep. 23, 2014

(65) Prior Publication Data

US 2015/0226832 A1 Aug. 13, 2015

(30) Foreign Application Priority Data

Feb. 7, 2014 (JP) ................................. 2014-022246

(51) Int. Cl.
*G01S 5/02* (2010.01)
*G01S 13/87* (2006.01)

(52) U.S. Cl.
CPC ................ *G01S 5/02* (2013.01); *G01S 5/0226* (2013.01); *G01S 13/878* (2013.01)

(58) Field of Classification Search
None
See application file for complete search history.

(56) References Cited

U.S. PATENT DOCUMENTS

| | | | | |
|---|---|---|---|---|
| 5,604,765 | A * | 2/1997 | Bruno | G01C 21/206 340/8.1 |
| 5,984,051 | A * | 11/1999 | Morgan | B66B 1/468 187/316 |
| 6,738,628 | B1 * | 5/2004 | McCall | G01S 1/68 340/8.1 |
| 2007/0290924 | A1 * | 12/2007 | McCoy | G06Q 10/087 342/464 |

FOREIGN PATENT DOCUMENTS

| | | |
|---|---|---|
| JP | 2003-233715 | 8/2003 |
| JP | 2004-301380 | 10/2004 |

* cited by examiner

*Primary Examiner* — Gregory C Issing
(74) *Attorney, Agent, or Firm* — Oblon, McClelland, Maier & Neustadt, L.L.P.

(57) ABSTRACT

A position detection system includes a responder configured to be carried by a user; interrogators, and a position detection unit configured to detect the user. The responder includes: a responder reception unit configured to receive interrogator identification information and floor identification information from the interrogator, a current floor identification information storage unit configured to store therein the floor identification information, and a responder transmission unit configured to determine whether to transmit the user identification information to the interrogator, when a transmission source of the received interrogator identification information is the interrogator provided in the room, and wherein the position detection unit comprises a position determination unit configured to detect that a position in the room of the floor, at which the user exists, is adjacent to the interrogator, based on the interrogator identification information and user identification information received from the interrogator.

8 Claims, 9 Drawing Sheets

POSITION DETECTION SYSTEM

CROSS-REFERENCE TO RELATED APPLICATION

This application claims priority from Japanese Patent Application No. 2014-022246 filed on Feb. 7, 2014, the entire subject matter of which is incorporated herein by reference.

TECHNICAL FIELD

This disclosure relates to a position detection system configured to detect a position of a user in a room.

BACKGROUND

A position detection system configured to detect a position of a user in a room is applied to a variety of fields. For example, JP-A-2004-301380 discloses an air conditioning system capable of locally air-conditioning a vicinity of a user by arranging a plurality of tag readers on a matrix in a room to thus detect a position of the user with precision. However, when detecting a position of a user with the air conditioning system disclosed in JP-A-2004-301380 in a building having a plurality of floors, a tag carried by the user and a tag reader provided for a floor adjacent to a floor at which the user exists, are enabled to communicate with each other. As a result, a misdetection that the user exists at a floor different from the floor at which the user actually exists occurs.

Figure 9:
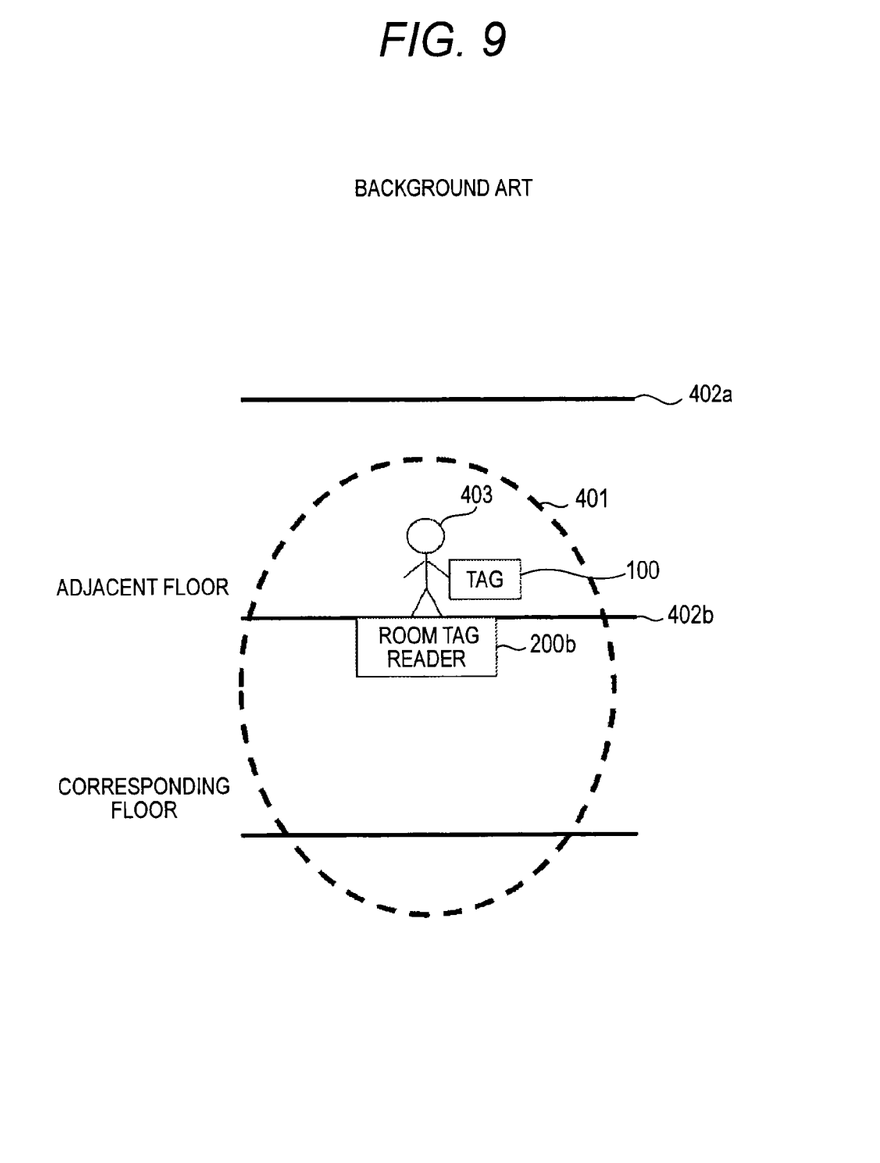
FIG. 9 is a schematic view showing a misdetection that a user of a tag reader is at a floor different from a floor at which the user actually exists in the background art.

FIG. 9 is a schematic view showing a misdetection that a user exists at a floor different from a floor at which the user actually is in the background art. A tag reader 200b mounted on a ceiling 400b of a corresponding floor performs communication with a tag carried by a user 402 existing at the corresponding floor, thereby detecting a position of the user. However, as shown in FIG. 9, a signal arriving range of the tag reader 200b extends to not only the corresponding floor but also an adjacent floor. Thus, if a user carrying a tag 100 is at the adjacent floor, the tag 100 detects a leakage signal to the adjacent floor, which is generated from the tag reader 200b, so that a misdetection is caused.

SUMMARY

This disclosure is to provide a position detection system capable of suppressing a misdetection that is caused at a floor different from a floor at which a user actually exists.

A position detection system of this disclosure includes: a responder configured to be carried by a user; interrogators arranged at a room entrance of each floor and at a plurality of specific places in a room, and a position detection unit configured to detect a floor at which the user exists and a position in a room of each floor at which the user exists. Each of the interrogators includes: an interrogator transmission unit configured to transmit interrogator identification information, which is determined by the room entrance of each floor or the place in the room at which the interrogator is provided, and floor identification information, which is determined by a floor at which the interrogator is provided, and an interrogator reception unit configured to receive user identification information from the responder and to transmit the user identification information and the interrogator identification information to the position detection unit. The responder comprises: a responder reception unit configured to receive the interrogator identification information and the floor identification information from the interrogator, a current floor identification information storage unit configured to store therein the floor identification information when a transmission source of the received interrogator identification information is the interrogator provided at the entrance, and a responder transmission unit configured to transmit the user identification information to the interrogator in a case where the floor identification information stored in the current floor identification information storage unit coincides with the received floor identification information, and is configured to not transmit the user identification information in case where the stored floor identification information does not coincide with the received floor identification information, when a transmission source of the received interrogator identification information is the interrogator provided in the room, and the position detection unit comprises a position determination unit configured to detect that a position in the room of the floor, at which the user exists, is adjacent to the interrogator, based on the interrogator identification information and user identification information received from the interrogator.

The position detection system of this disclosure is configured as described above. Thus, only when the tag reader is a tag reader provided at the same floor as the floor identification information stored in the tag, the user identification information and the interrogator identification information are transmitted to the position detection unit, so that the floor and a position in the room at which the user exists are detected. Therefore, it is possible to suppress the position detection unit from mis-detecting the floor at which the user exists.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment

Hereinafter, configurations and operations of this illustrative embodiment will be described with reference to FIGS. 1 to 5.

Figure 1:
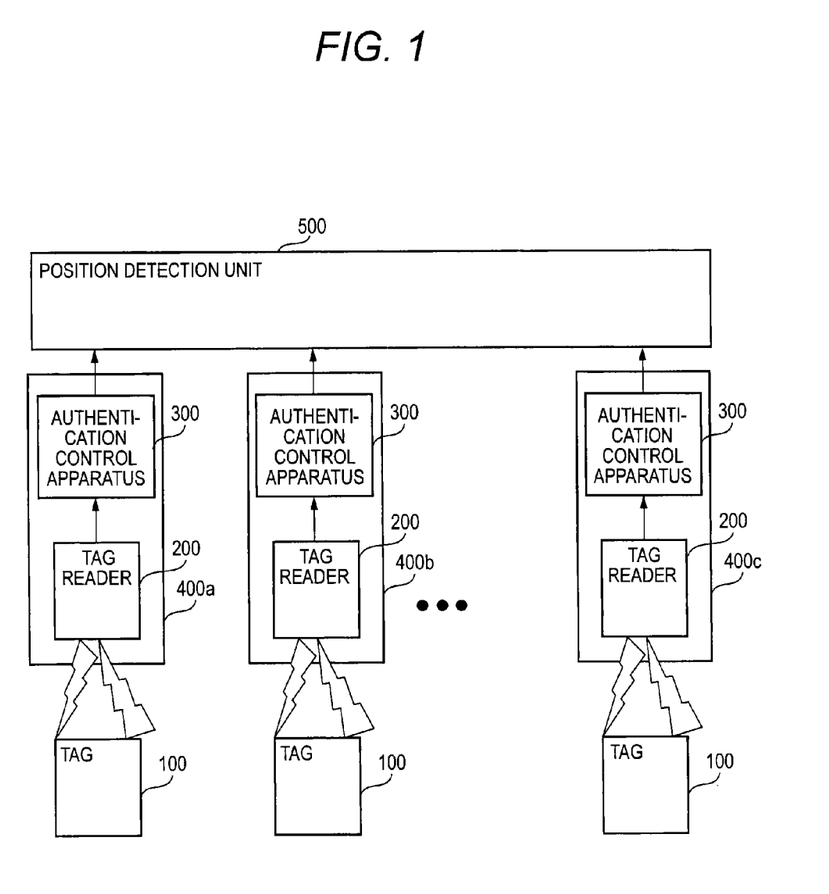
FIG. 1 is an overall configuration view of a position detection system according to a first illustrative embodiment of this disclosure.

FIG. 1 shows an overall configuration of a position detection system according to this illustrative embodiment. In FIG. 1, reference numerals 400a to 400c indicate rooms at each floor. A reference numeral 100 indicates a tag (a responder) carried by a user. A reference numeral 200 indicates a tag reader (an interrogator) provided for each room and an entrance of a room at each floor and configured to perform communication with the tag 100. A reference numeral 300 indicates an authentication control apparatus for authenticating a user and the authentication control apparatus is configured to receive user identification information and interrogator identification information from the tag reader 200 in the room, thereby authenticating the user. A reference numeral 500 indicates a position detection unit configured to detect a floor and a position in a room at which the user exists, based on the user identification information and interrogator identification information received from the authentication control apparatus 300 provided at each floor.

Figure 2:
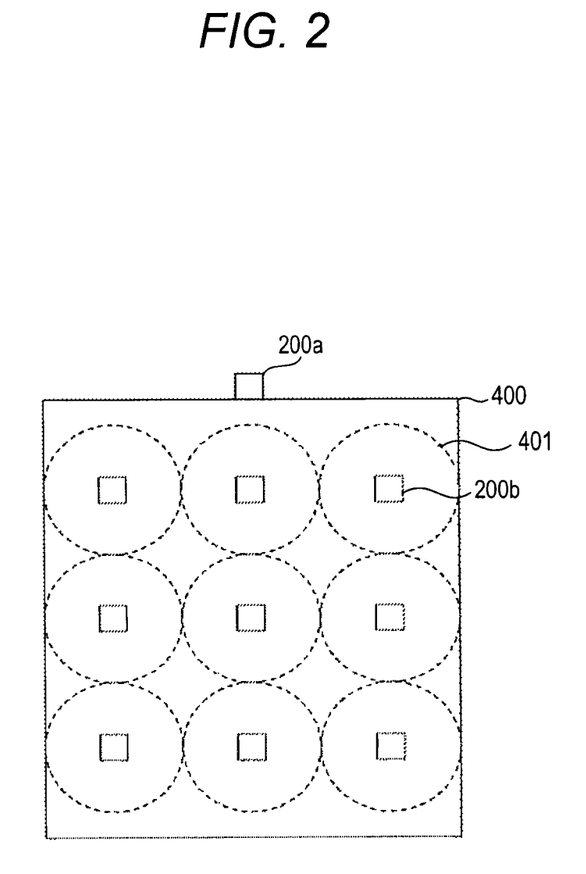
FIG. 2 is an arrangement view in a room of the position detection system according to the first illustrative embodiment of this disclosure.

FIG. 2 is an arrangement view in a room of the position detection system according to this illustrative embodiment. A reference numeral 200a indicates a tag reader arranged in the vicinity of an entrance of a room 400, which should be a contact type or proximity type tag reader so as not to be influenced by a leakage signal from an adjacent floor because it is necessary to correctly store floor identification information in the tag 100 carried by the user. A reference numeral 200b indicates a plurality of tag readers arranged at a constant interval on a ceiling in the room, on the floor and the like.

A reference numeral 401 indicates a signal arriving range within which each tag reader 200b in the room performs communication with the tag 100. When the user carrying the tag 100 is within the signal arriving range 401, it is possible to detect that the user exists within the range of each tag reader 200b.

Figure 3:
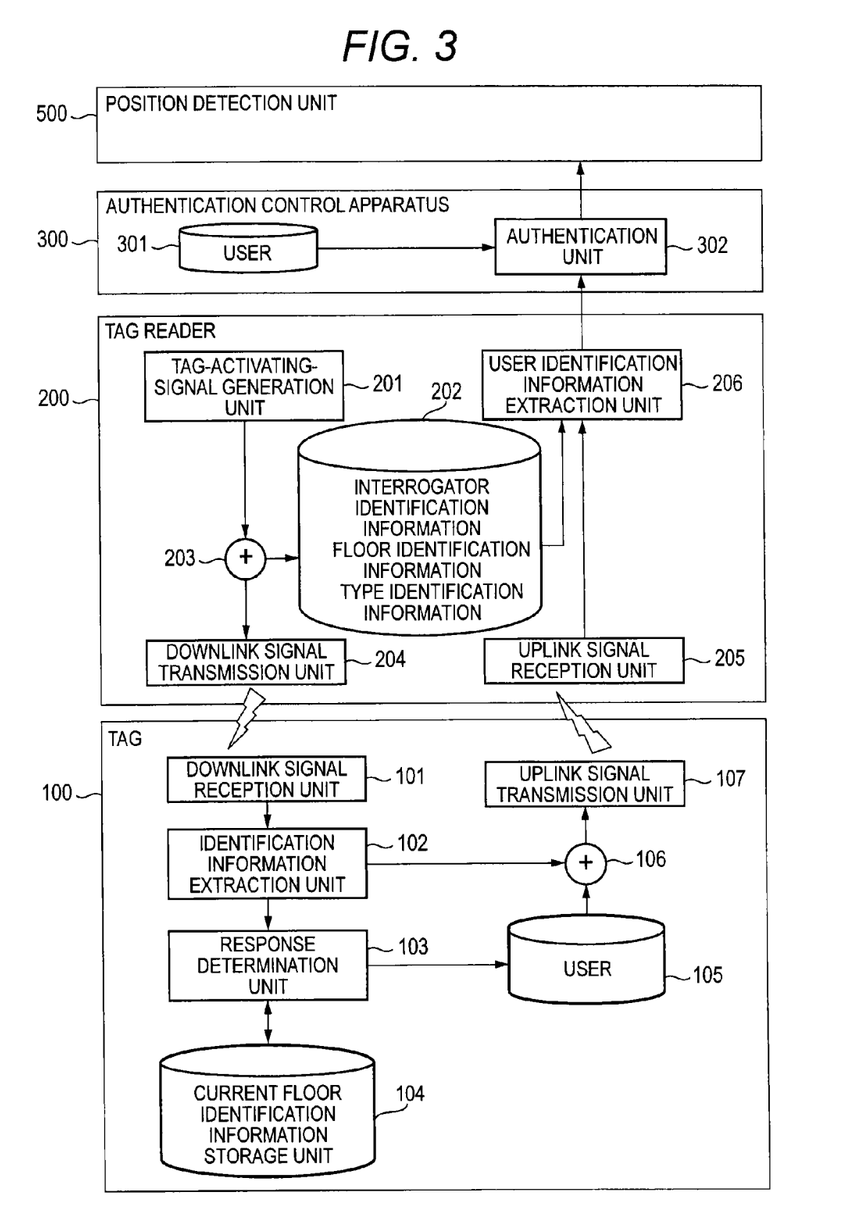
FIG. 3 is a detailed configuration view of the position detection system according to the first illustrative embodiment of this disclosure.

FIG. 3 shows a configuration of the position detection system of this illustrative embodiment.

The tag 100 is provided with a downlink signal reception unit 101 configured to receive a downlink signal from the tag reader 200, an identification information extraction unit 102 configured to extract interrogator identification information, type identification information and floor identification information from the downlink signal, a response determination unit 103 configured to determine whether to store the floor identification information received from the tag reader 200 provided in the vicinity of the room entrance or to transmit the user identification information to the tag reader 200b provided in the room by an uplink signal, on the basis of the type identification information and the floor identification information, a multiplexing unit 106 configured to generate data to be carried on the uplink signal from the interrogator identification information and the user identification information, an uplink signal transmission unit 107 configured to transmit an uplink signal including the user identification information and the interrogator identification information, a current floor identification information storage unit 104 configured to store therein the floor identification information received from the tag reader 200a provided in the vicinity of the room entrance and a storage area 105 configured to store therein the user identification information.

The downlink signal reception unit 101 includes a reception antenna circuit for receiving the downlink signal from the tag reader 200. The uplink signal transmission unit 107 includes a transmission antenna circuit for transmitting the uplink signal to the tag reader 200.

The tag reader 200 is provided with a tag-activating-signal generation unit 201 configured to generate a tag activating signal for activating the tag 100, a multiplexing unit 203 configured to provide the tag activating signal with the interrogator identification information, the type identification information and the floor identification information and to generate data to be carried on the downlink signal, a downlink signal transmission unit 204 configured to transmit the data generated in the multiplexing unit 203 as the downlink signal, an uplink signal reception unit 205 configured to receive the uplink signal from the tag 100, a user identification information extraction unit 206 configured to extract the user identification information included in the uplink signal and to transmit the same to the authentication control apparatus 300 together with the interrogator identification information stored in a storage area 202, and the storage area 202 configured to store therein the interrogator identification information, the type identification information and the floor identification information. The downlink signal transmission unit 204 includes a transmission antenna circuit for transmitting the downlink signal to the tag 100. The uplink signal reception unit 205 includes a reception antenna circuit for receiving the uplink signal from the tag 100.

The authentication control apparatus 300 is provided with an authentication unit 302 configured to compare the user identification information transmitted from the tag reader 200 with stored personal information and to transmit the user identification information and interrogator identification information to the position detection unit 500 when the information coincides with each other, and a storage area 301 configured to store therein a plurality of user identification information.

In the below, operations of this illustrative embodiment are described.

Figure 4:
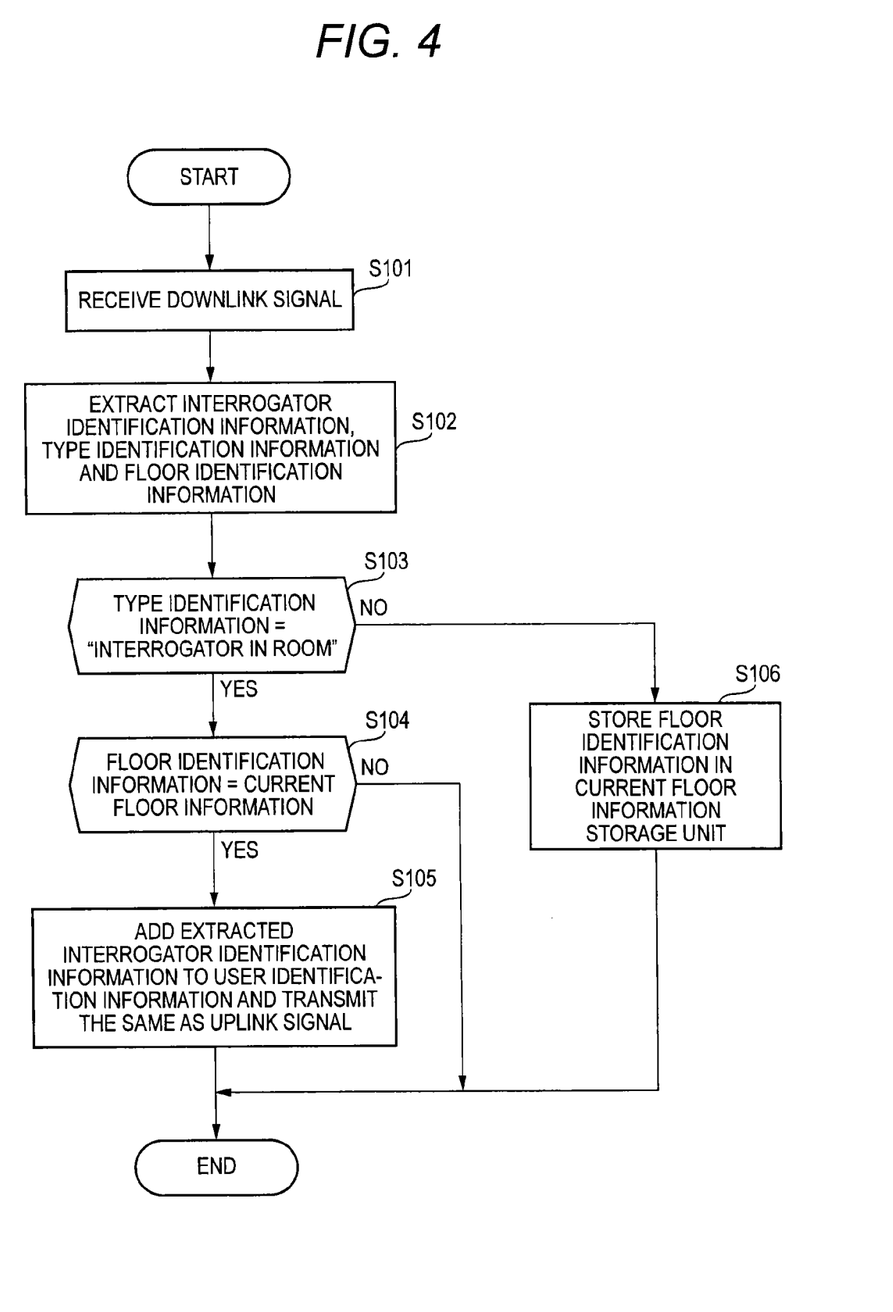
FIG. 4 is a flowchart showing operations of a tag reader (an interrogator) according to the first illustrative embodiment of this disclosure.

FIG. 4 is a flowchart showing operations of the tag 100. The tag 100 receives the tag activating signal from the tag reader 200 at the downlink signal reception unit 101 (S101). The identification information extraction unit 102 in the tag 100 extracts the interrogator identification information, type identification information and floor identification information from the activating signal (S102).

Here, the type identification information is information for identifying whether the tag reader 200 is provided in the vicinity of the room entrance or in the room. The floor identification information is information indicating what floor the tag reader 200 is provided. Both the information is preset in the tag reader 200 and is transmitted with being included in the downlink signal from the tag reader 200.

The response determination unit 103 determines whether the tag reader 200 having transmitted the downlink signal is provided in the vicinity of the room entrance or in the room, based on the type identification information (S103).

In a case where it is determined in S103 that the tag reader 200 having transmitted the downlink signal is provided on the ceiling, the tag compares the floor identification information extracted in S102 with the floor identification information stored in the current floor identification information storage unit 104 (S104).

In a case where it is determined in S104 that the floor identification information extracted in S102 coincides with the floor identification information stored in the current floor identification information storage unit 104, the tag provides the user identification information with the interrogator identification information extracted in S102 and transmits the same from the uplink signal transmission unit 107, as the uplink signal. Thereby, the processing is terminated (S105). If the information does not coincide with each other, the tag completes the processing without transmitting the uplink signal.

On the other hand, in a case where it is determined in S103 that the tag reader 200 having transmitted the downlink signal is provided in the vicinity of the room entrance, the tag stores the floor identification information extracted in S102 in the current floor identification information storage unit 104 without transmitting the interrogator identification information and the user identification information (S106).

Figure 5:
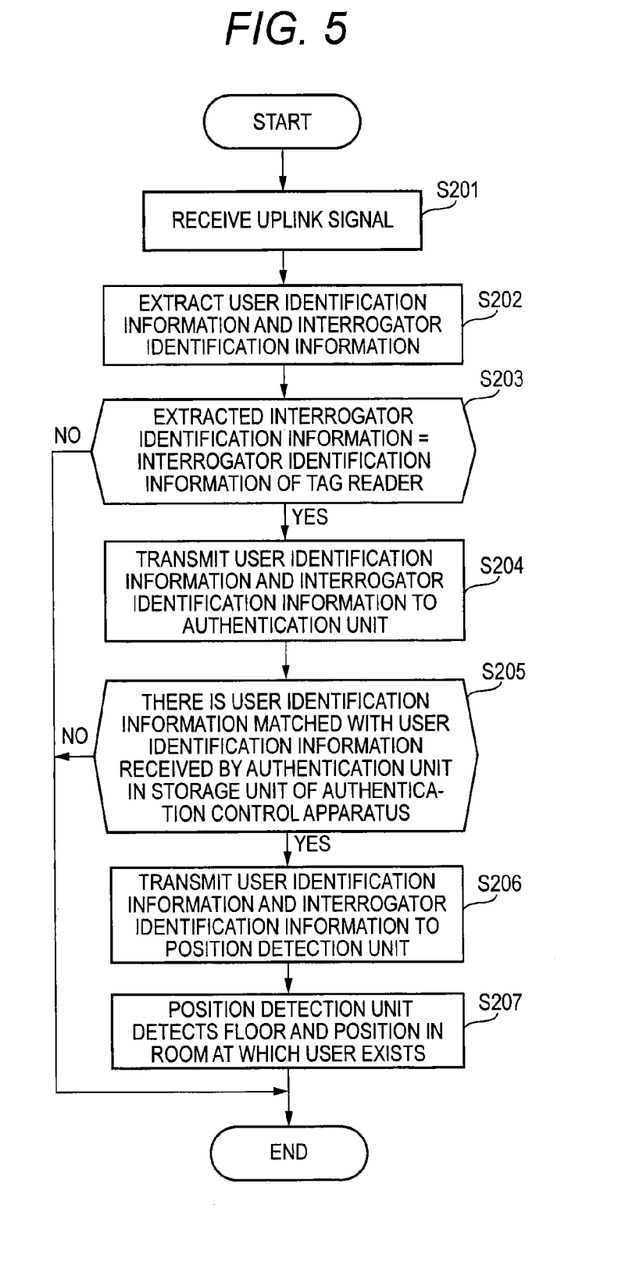
FIG. 5 is a flowchart showing operations of a tag (a responder) according to the first illustrative embodiment of this disclosure.

FIG. 5 is a flowchart showing operations of the tag reader 200. The tag reader 200 generates a tag activating signal at the tag-activating-signal generation unit 201 every predetermined time, provides the tag activating signal with the interrogator identification information, which is an inherent number to each tag reader and is stored in the storage area 202, and transmits the downlink signal from the downlink signal transmission unit 204.

The uplink signal reception unit 205 of the tag reader 200 receives the uplink signal from the tag 100 (S201).

The user identification information extraction unit 206 of the tag reader 200 extracts the user identification information and interrogator identification information from the uplink signal (S202).

The user identification information extraction unit 206 of the tag reader 200 compares the interrogator identification information thereof stored in the storage area 202 with the extracted interrogator identification information (S203).

As a result of the comparison of the interrogator identification information thereof stored in the storage area 202 and the extracted interrogator identification information by the user identification information extraction unit 206 of the tag reader 200, when the information coincides with each other, the tag reader 200 transmits the user identification information and interrogator identification information to the authentication control apparatus 300 (S204).

When the authentication control apparatus 300 receives the user identification information and interrogator identification information from the tag reader 200, the authentication unit 302 searches the user identification information matched with the received user identification information from the plurality of user identification information stored in the storage unit 301 (S205).

When the authentication unit 302 found the user identification information matched with the received user identification information from the plurality of user identification information stored in the storage unit 301 in S205, the tag reader transmits the received user identification information and interrogator identification information to the position detection unit 500 (S206).

The position detection unit 500 detects a floor and a position in a room at which the user exists, based on the transmitted user identification information and interrogator identification information (S207).

As described above, according to this illustrative embodiment, the floor identification information transmitted from the tag reader 200*a* provided in the vicinity of the room entrance is pre-recorded in the tag 100 carried by the user and the floor identification information transmitted from the tag reader 200*b* provided in the room and the pre-recorded floor identification information are compared. Only when the information coincides with each other, the user identification information and the interrogator identification information are transmitted to the tag reader 200*a* provided in the room. As a result, when the signal transmitted by the tag reader 200*a* provided in the room leaks to an adjacent floor, it is possible to suppress the position detection unit 500 from mis-detecting the floor at which the user exists.

In the illustrative embodiment, the response determination unit 103 determines whether the tag reader 200 having transmitted the downlink signal is provided in the vicinity of the room entrance or in the room, based on the type identification information. However, the response determination unit may use the interrogator identification information received by the tag.

Also, the tag reader 200*a* provided in the vicinity of the entrance has the same configuration as the tag reader 200*b* provided in the room. However, the tag reader 200*a* provided in the vicinity of the entrance may have only to perform the transmission and any one or both of the uplink signal reception unit 205 and the user identification information extraction unit 206 may be omitted.

Also, in the above illustrative embodiment, even though the floor identification information is recorded in the tag 100 carried by the user, the tag reader 200*a* provided in the vicinity of the entrance performs communication by using the signal. However, any means may be used inasmuch as it can securely record the floor identification information in advance before the user enters the room.

Also, although the tag and the tag reader are used as the responder and the interrogator, this disclosure is not limited to the tag and the tag reader. For example, an apparatus and a device having the equivalent functions such as a portable phone and a smart phone may be also used.

In addition, even when the parts of the configuration may be modified or omitted, the same effects as the illustrative embodiment can be realized.

Second Illustrative Embodiment

In the first illustrative embodiment, the tag reader 200*a* provided in the vicinity of the room entrance and the tag reader 200*b* provided in the room are distinguished by the type identification information, and the floor identification information pre-recorded in the tag 100 by the tag reader 200*a* provided in the vicinity of the room entrance and the floor identification information transmitted to the tag 100 by the tag reader provided in the room are compared in the tag 100. Only when the information coincides with each other, the interrogator identification information and the user identification information are transmitted to the tag reader 200*b*. However, the floor identification information pre-recorded in the tag 100 by the tag reader 200*a* provided in the vicinity of the room entrance may be transmitted to the tag reader 200*b* provided in the room, the floor identification information received by the tag reader 200*b* and the floor identification information of the tag reader 200*b* may be compared in the tag reader 200*b*, and only when the information coincides with each other, the floor identification information and the interrogator identification information may be transmitted to the authentication control apparatus 300. In this case, the type identification information is not necessary. An illustrative embodiment of this case is described.

In the below, configurations and operations of this illustrative embodiment are described with reference to FIGS. 6 to 8.

The descriptions about the same configurations as the first illustrative embodiment are omitted. The overall configuration and the arrangement in the room are the same as the first illustrative embodiment, and the descriptions thereof are thus omitted.

Figure 6:
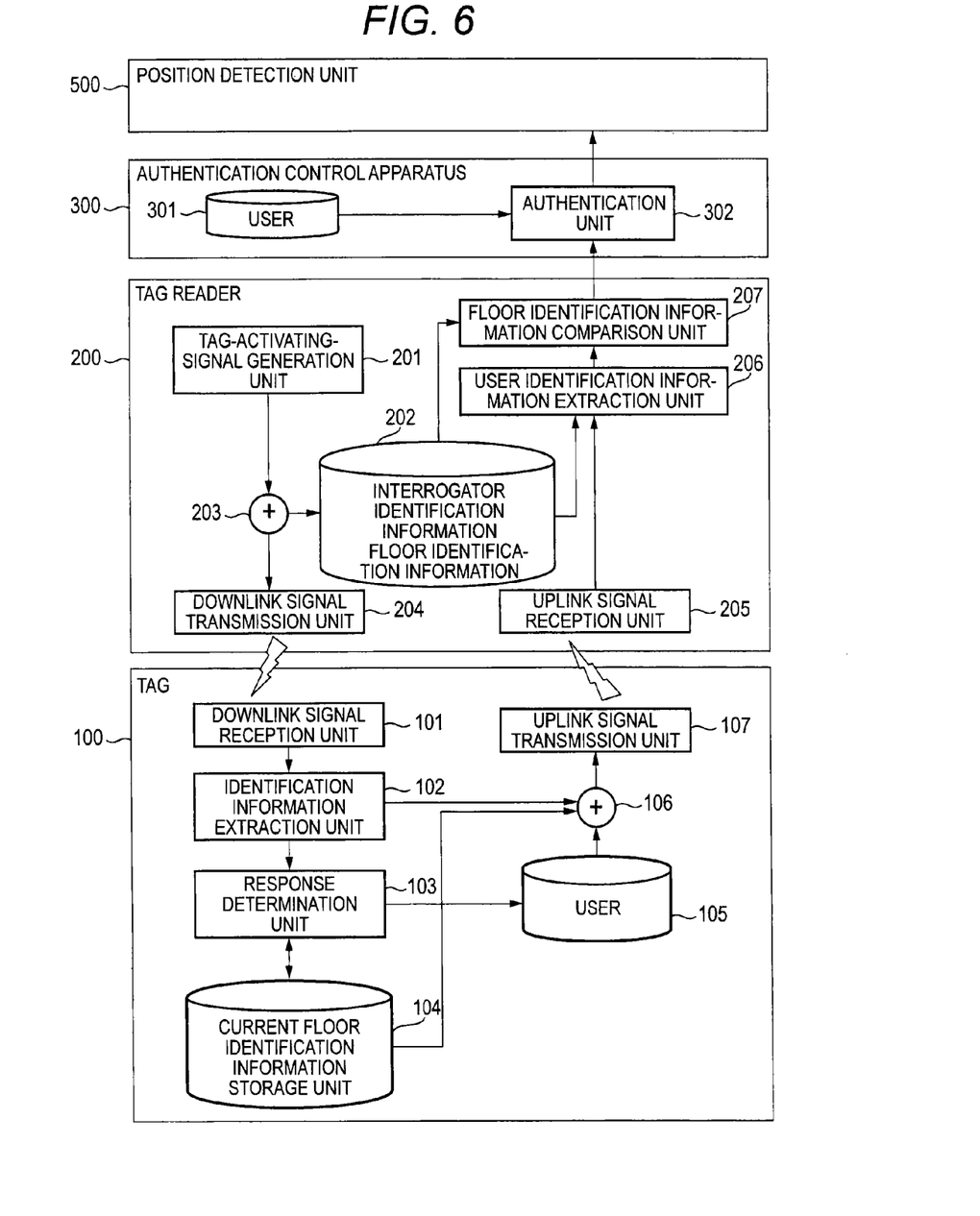
FIG. 6 is a detailed configuration view of a position detection system according to a second illustrative embodiment of this disclosure.

FIG. 6 is a configuration view of a position detection system of this illustrative embodiment. In FIG. 6, the authentication control apparatus 300 is the same as the first illustrative embodiment and the descriptions thereof are thus omitted.

The tag 100 is provided with a downlink signal reception unit 101 configured to receive a downlink signal from the tag reader 200, an identification information extraction unit 102 configured to extract interrogator identification information and floor identification information from the downlink signal, a response determination unit 103 configured to determine whether to store the received floor identification information in a current floor identification information storage unit 104 or to transmit the user identification information to the tag reader 200 by an uplink signal, depending on whether the floor identification information exists in the identification information received at the identification information extraction unit 102, a multiplexing unit 106 configured to generate data to be carried on the uplink signal from the interrogator identification information, the user identification information and the floor identification information stored in the current floor identification information storage unit 104, an uplink signal transmission unit 107 configured to transmit an uplink signal including the user identification information, the interrogator identification information and the floor identification information, the current floor identification information storage unit 104 configured to store therein the current floor information, and a storage area 105 configured to store therein the user identification information. The downlink signal reception unit 101 includes a reception antenna circuit for receiving the downlink signal from the tag reader 200. The uplink signal transmission unit 107 includes a transmission antenna circuit for transmitting the uplink signal to the tag reader 200.

The tag reader 200 is provided with a tag-activating-signal generation unit 201 configured to generate a tag activating signal for activating the tag 100, a multiplexing unit 203 configured to provide the tag activating signal with the interrogator identification information and the floor identification information and to generate data to be carried on the downlink signal when the tag reader 200 is provided in the vicinity of a room entrance and to provide the tag activating signal with the interrogator identification information and to generate data to be carried on the downlink signal when the tag reader 200 is provided in a room, a downlink signal transmission unit 204 configured to transmit the data generated in the multiplexing unit 203 as the downlink signal, an uplink signal reception unit 205 configured to receive the uplink signal from the tag 100, a user identification information extraction unit 207 configured to extract the user identification information and floor identification information included in the uplink signal and to transmit the same to a floor identification information comparison unit 208 together with the interrogator identification information stored in a storage area 202, the floor identification information comparison unit 208 configured to transmit the user identification information and the interrogator identification information to the authentication control apparatus 300 when the received floor identification information coincides with the floor identification information stored in an interrogator, and the storage area 202 configured to store therein the interrogator identification information and the floor identification information. The downlink signal transmission unit 204 includes a transmission antenna circuit for transmitting the downlink signal to the tag 100. The uplink signal reception unit 205 includes a reception antenna circuit for receiving the uplink signal from the tag 100.

Figure 7:
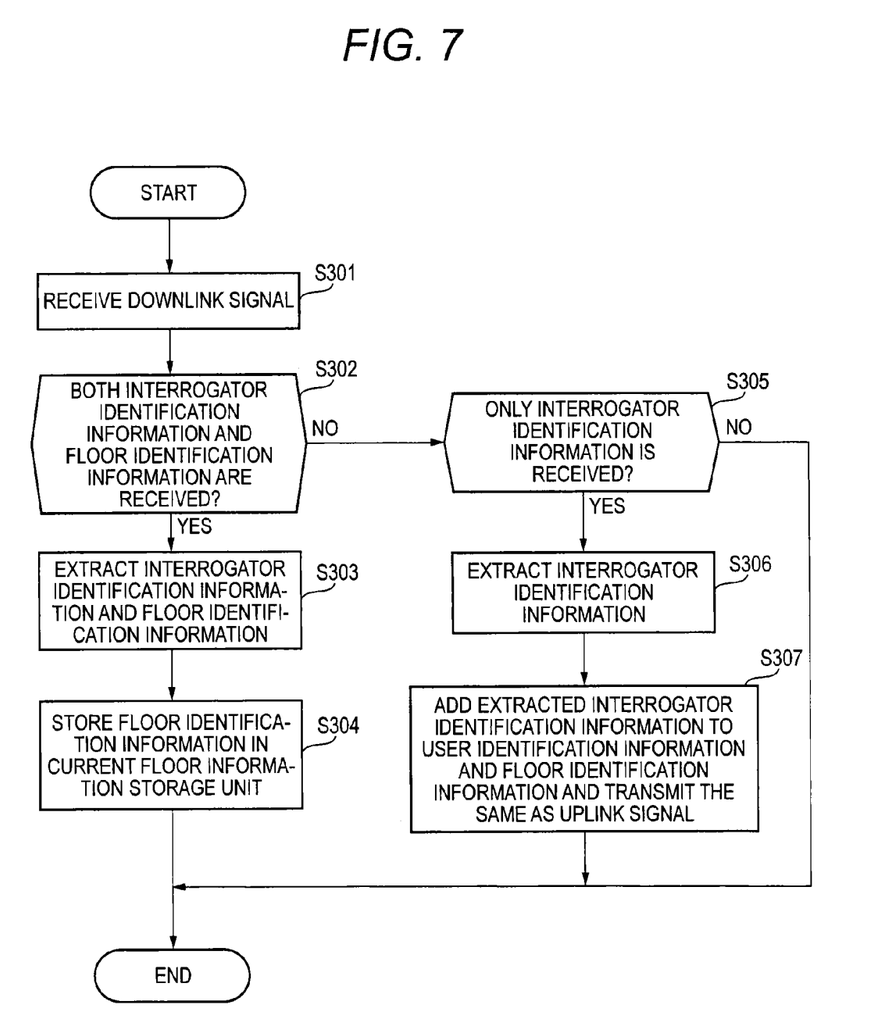
FIG. 7 is a flowchart showing operations of a tag reader (an interrogator) according to the second illustrative embodiment of this disclosure.

FIG. 7 is a flowchart showing operations of the tag 100. The tag 100 receives the tag activating signal from the tag reader 200 at the downlink signal reception unit 101 (S301).

The identification information extraction unit 102 determines whether both the interrogator identification information and the floor identification information are included in the received tag activating signal (S302).

In a case where it is determined in S302 that both the interrogator identification information and the floor identification information are included in the received tag activating signal, the identification information extraction unit 102 extracts the interrogator identification information and floor identification information from the received tag activating signal (S303).

The tag stores the floor identification information extracted in S303 in the current floor identification information storage unit 104 and completes the processing without transmitting the user identification information (S304).

On the other hand, in a case where it is determined in S302 that only the interrogator identification information is included in the received tag activating signal (S305), the identification information extraction unit 102 extracts only the interrogator identification information from the tag activating signal (S306).

Then, the tag provides the user identification information with the floor identification information stored in the current floor identification information storage unit 104 and the interrogator identification information extracted in S306, transmits the same, as the uplink signal, from the uplink signal transmission unit 107 and completes the processing (S307).

When it is not determined in S305 that only the interrogator identification information is included in the received tag activating signal, the tag completes the processing without performing any processing.

Figure 8:
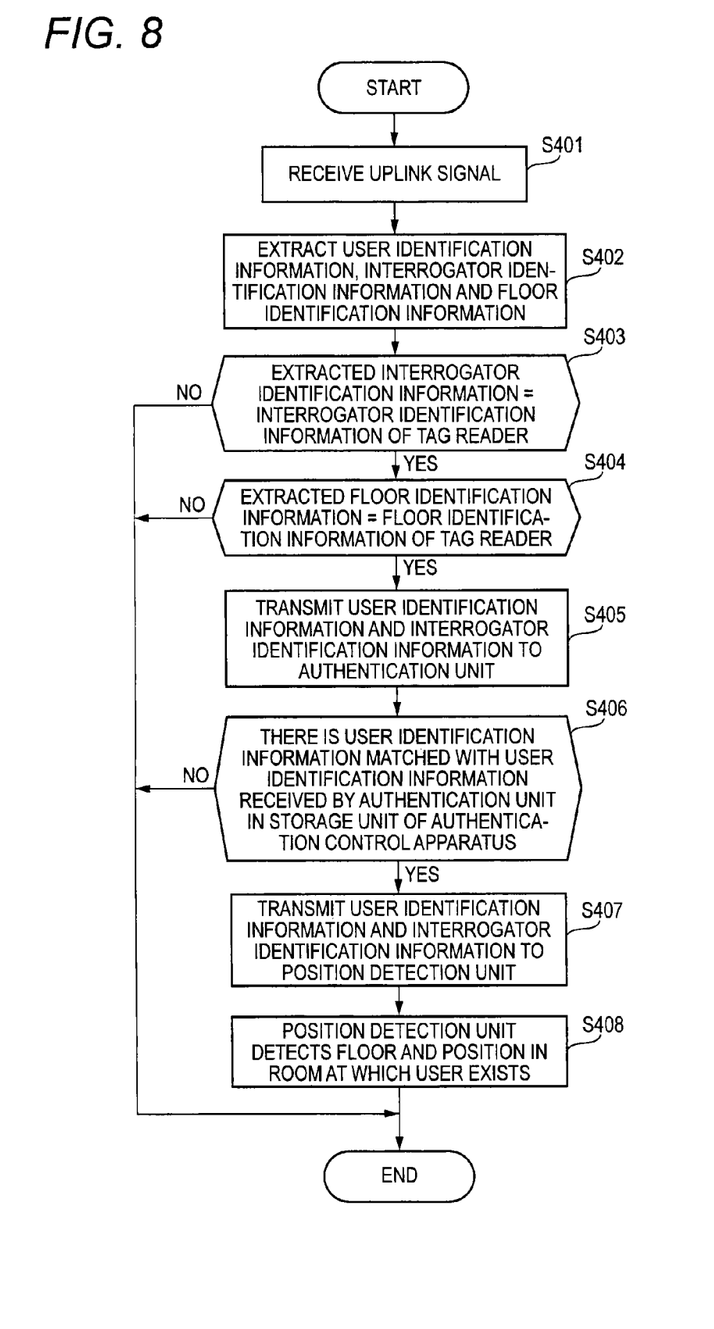
FIG. 8 is a flowchart showing operations of a tag (a responder) according to the second illustrative embodiment of this disclosure.

FIG. 8 is a flowchart showing operations of the tag reader 200. The uplink signal reception unit 205 of the tag reader 200 receives the uplink signal from the tag 100 (S401).

The user identification information extraction unit 206 of the tag reader 200 extracts the user identification information, the interrogator identification information and the floor identification information from the uplink signal (S402).

The user identification information extraction unit 206 of the tag reader 200 compares the interrogator identification information thereof stored in the storage area 202 with the extracted interrogator identification information (S403).

In a case where it is determined in S403 that the interrogator identification information thereof stored in the storage area 202 coincides with the extracted interrogator identification information, the user identification information extraction unit 206 further compares the received floor identification information with the floor identification information of the tag reader 200 (S404).

In a case where it is determined in S404 that the received floor identification information coincides with the floor identification information of the tag reader 200, the tag reader 200 transmits the user identification information and the interrogator identification information to the authentication control apparatus 300 (S405).

When the authentication control apparatus 300 receives the user identification information and interrogator identification information from the tag reader 200, the authentication unit 302 searches the user identification information matched with the received user identification information from the plurality of user identification information stored in the storage unit 301 (S406).

As a result of the comparison of the received user identification information and the plurality of user identification information stored in the storage unit 301 in S406 by the authentication unit 302, when the matched user identification information is searched, the tag reader transmits the received user identification information and interrogator identification information to the position detection unit 500.

The position detection unit 500 detects a floor and a position in a room at which the user exists, based on the transmitted user identification information and interrogator identification information (S408).

As described above, according to this illustrative embodiment, the floor identification information transmitted from the tag reader 200a provided in the vicinity of the room entrance is pre-recorded in the tag 100 carried by the user. After the user enters the room, the floor identification information recorded in the tag 100 is transmitted to the tag reader 200b provided in the room and the floor identification information stored in the tag reader 200b and the received floor identification information are compared. Only when the information coincides with each other, the tag reader 200a provided in the room transmits the user identification information and the interrogator identification information to the authentication control apparatus 300. As a result, when the signal transmitted by the tag reader 200a provided in the room leaks to an adjacent floor, it is possible to suppress the position detection unit 500 from mis-detecting the floor at which the user exists.

In the illustrative embodiment, the tag reader 200a provided in the vicinity of the entrance has the same configuration as the tag reader 200b provided in the room. However, the tag reader 200a provided in the vicinity of the entrance may have only to perform the transmission and any one or both of the uplink signal reception unit 205 and the user identification information extraction unit 206 may be omitted.

Also, even though the floor identification information is recorded in the tag 100 carried by the user, the tag reader 200a provided in the vicinity of the entrance performs communication by using the signal. However, any means may be used inasmuch as it can securely record the floor identification information in advance before the user enters the room.

Also, although the tag and the tag reader are used as the responder and the interrogator, this disclosure is not limited to the tag and the tag reader. For example, an apparatus and a device having the equivalent functions such as a portable phone and a smart phone may be also used.

In addition, even when the parts of the configuration may be modified or omitted, the same effects as the illustrative embodiment can be realized This disclosure can be applied to a position detection system using an RFID.

What is claimed is:

1. A position detection system comprising:
a responder configured to be carried by a user;
interrogators arranged at a room entrance of each floor and at a plurality of specific places in a room, and
a position detection unit configured to detect a floor at which the user exists and a position in a room of each floor at which the user exists,
wherein each of the interrogators comprises:
an interrogator transmission unit configured to transmit interrogator identification information, which is determined by the room entrance of each floor or the place in the room at which the interrogator is provided, and floor identification information, which is determined by a floor at which the interrogator is provided, and
an interrogator reception unit configured to receive user identification information from the responder and to transmit the user identification information and the interrogator identification information to the position detection unit,
wherein the responder comprises:
a responder reception unit configured to receive the interrogator identification information and the floor identification information from the interrogator,
a current floor identification information storage unit configured to store therein the floor identification information when a transmission source of the received interrogator identification information is the interrogator provided at the entrance, and
a responder transmission unit configured to transmit the user identification information to the interrogator in a case where the floor identification information stored in the current floor identification information storage unit coincides with the received floor identification information, and is configured to not transmit the user identification information in case where the stored floor identification information does not coincide with the received floor identification information, when a transmission source of the received interrogator identification information is the interrogator provided in the room, and
wherein the position detection unit comprises a position determination unit configured to detect that a position in the room of the floor, at which the user exists, is adjacent to the interrogator, based on the interrogator identification information and user identification information received from the interrogator.

2. The position detection system according to claim 1, wherein the interrogator comprises the interrogator transmission unit also configured to transmit type identification information indicating whether each interrogator is the interrogator arranged at the room entrance or the interrogator arranged in the room, and
wherein in the responder,
the responder reception unit is configured to receive the type identification information from the interrogator,
the current floor identification information storage unit is configured to store therein the floor identification information when the type identification information indicates the interrogator arranged at the room entrance, and
the responder transmission unit is configured to transmit the user identification information to the interrogator if the floor identification information stored in the current floor identification information storage unit coincides with the received floor identification information, and is configured to not transmit the user identification information otherwise, when the type identification information indicates the interrogator arranged in the room.

3. The position detection system according to claim 1, wherein the interrogator arranged at the room entrance of each floor is a proximity type tag reader.

4. The position detection system according to claim 2, wherein the interrogator arranged at the room entrance of each floor is a proximity type tag reader.

5. The position detection system according to claim 1,
wherein the responder comprises the responder transmission unit also configured to transmit the interrogator identification information received from the interrogator when transmitting the user identification information to the interrogator, and
wherein the interrogator comprises the interrogator reception unit also configured to receive the interrogator identification information from the responder and to transmit the user identification information and the interrogator identification information to the position detection unit in a case where the received interrogator identification information coincides with the interrogator identification information of the interrogator and not to transmit any information in a case where the information does not coincide with each other.

6. A position detection system comprising:
a responder configured to be carried by a user;
interrogators arranged at a room entrance of each floor and at a plurality of specific places in a room, and
a position detection unit configured to detect a floor at which the user exists and a position in a room of each floor at which the user exists,
wherein each of the interrogators comprises:
an interrogator transmission unit configured to transmit interrogator identification information, which is determined by the room entrance of each floor or the place in the room at which the interrogator is provided, and floor identification information, which is determined by a floor at which the interrogator is provided, when the place at which the interrogator is provided is the room entrance, and
an interrogator reception unit configured to receive user identification information and the floor identification information from the responder and to transmit the user identification information and the interrogator identification information to the position detection unit when the received floor identification information coincides with the floor identification information of the interrogator and not to transmit any information when the information does not coincide with each other,
wherein the responder comprises:
a responder reception unit configured to receive both the interrogator identification information and the floor identification information or only the interrogator identification information from the interrogator,
a current floor identification information storage unit configured to store therein the floor identification information when the interrogator identification information and the floor identification information are received from the interrogator, and
a responder transmission unit configured to, when only the interrogator identification information is received from the interrogator, transmit the user identification information to the interrogator in a case where the floor identification information stored in the current floor identification information storage unit coincides with the received floor identification information, and is configured to not transmit the user identification information in a case where the floor identification information stored in the current floor identification information storage unit does not coincide with the received floor identification information, and
wherein the position detection unit comprises a position determination unit configured to detect that a position in the room of the floor, at which the user exists, is adjacent to the interrogator, based on the interrogator identification information and user identification information received from the interrogator.

7. The position detection system according to claim 6,
wherein the interrogator arranged at the room entrance of each floor is a proximity type tag reader.

8. The position detection system according to claim 6,
wherein the responder comprises the responder transmission unit also configured to transmit the interrogator identification information received from the interrogator when transmitting the user identification information to the interrogator, and
wherein the interrogator comprises the interrogator reception unit also configured to receive the interrogator identification information from the responder and to transmit the user identification information and the interrogator identification information to the position detection unit when the received interrogator identification information coincides with the interrogator identification information of the interrogator and not to transmit any information when the information does not coincide with each other.

* * * * *